N. C. BASSETT.
BALANCING MACHINE.
APPLICATION FILED FEB. 8, 1907.
923,402.
Patented June 1, 1909.
2 SHEETS—SHEET 1.
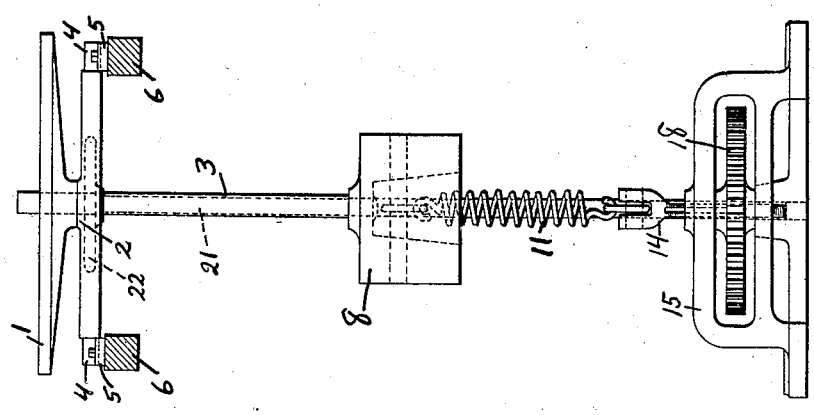
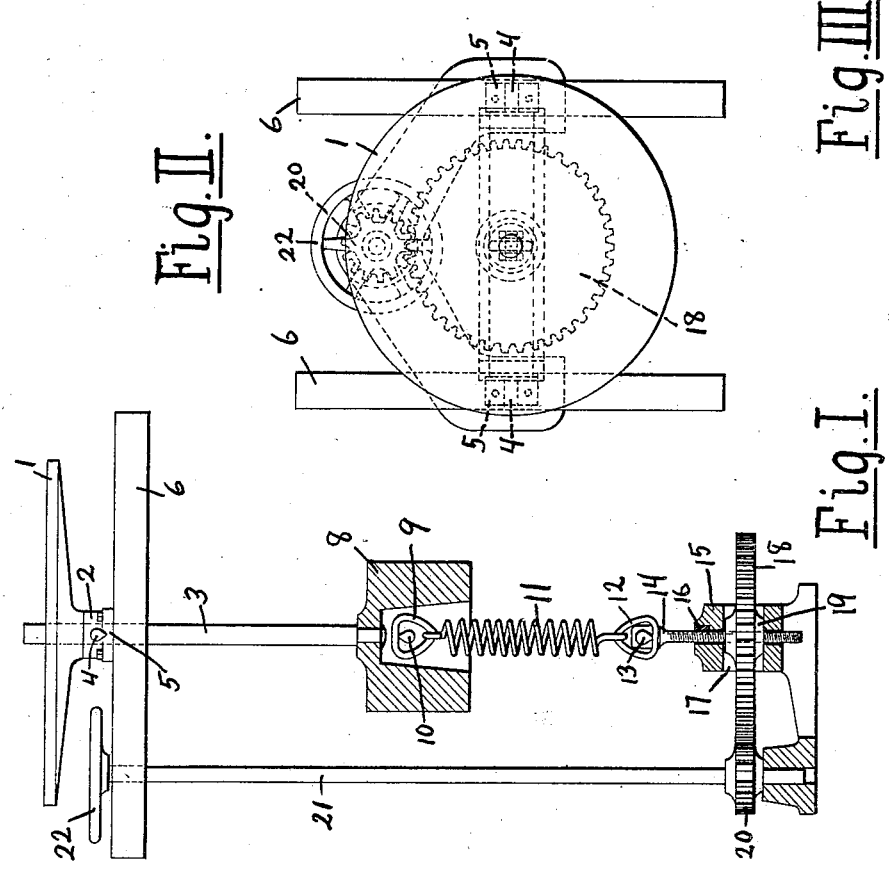
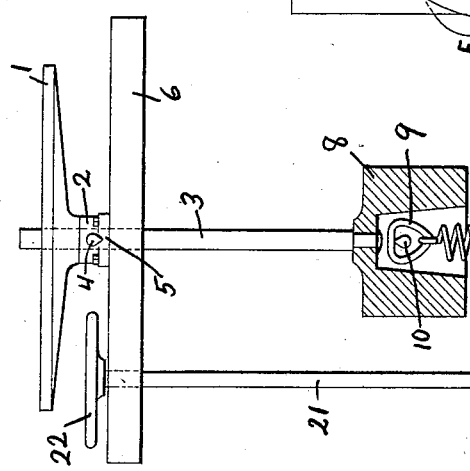

N. C. BASSETT.
BALANCING MACHINE.
APPLICATION FILED FEB. 8, 1907.
923,402.
Patented June 1, 1909.
2 SHEETS—SHEET 2.
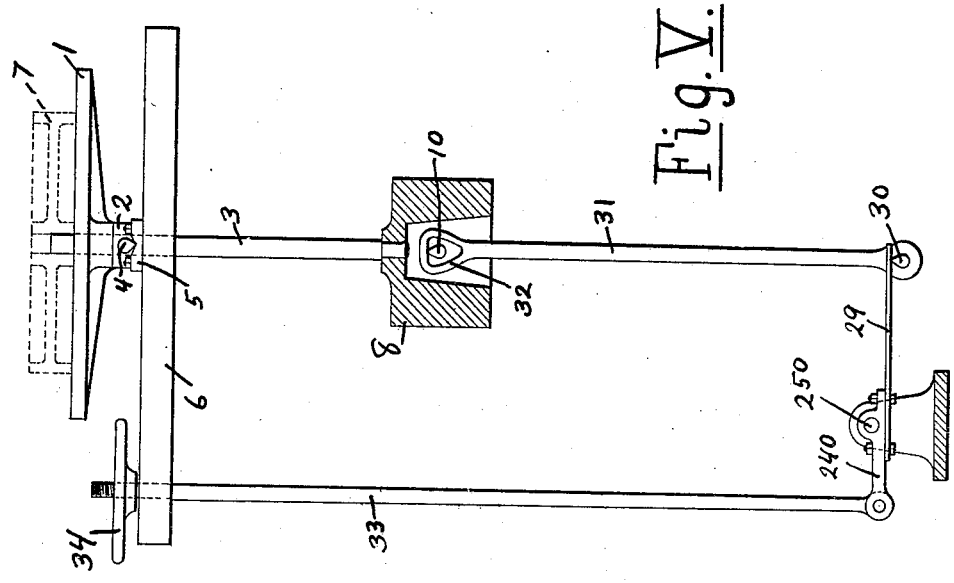
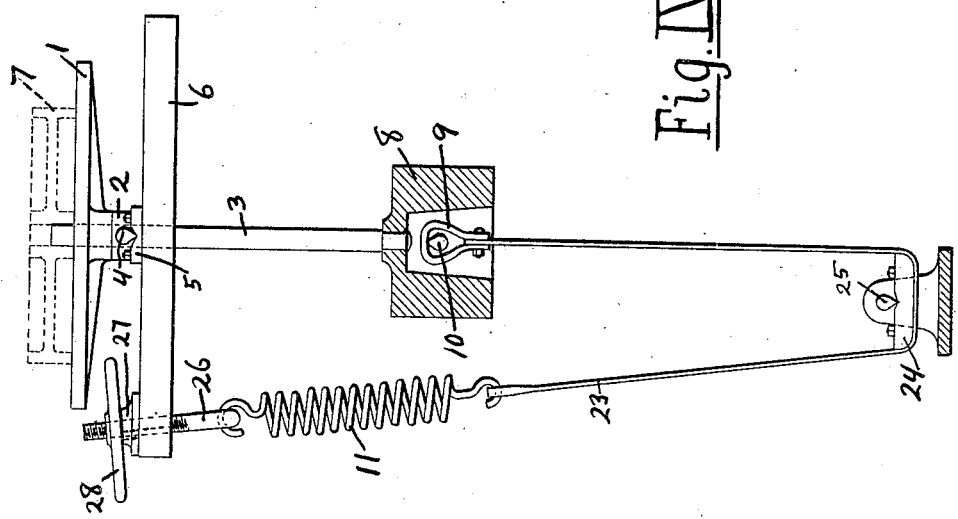
WITNESSES:
Frank E. Dennett
John C. Rennie
N. C. Bassett INVENTOR
BY
ATTORNEY.

UNITED STATES PATENT OFFICE.

NORMAN C. BASSETT, OF MILWAUKEE, WISCONSIN, ASSIGNOR TO ALLIS-CHALMERS COMPANY, OF MILWAUKEE, WISCONSIN, A CORPORATION OF NEW JERSEY.

BALANCING-MACHINE.

No. 923,402.    Specification of Letters Patent.    Patented June 1, 1909.

Application filed February 8, 1907. Serial No. 356,412.

*To all whom it may concern:*

Be it known that I, NORMAN C. BASSETT, a citizen of the United States, residing at Milwaukee, in the county of Milwaukee and State of Wisconsin, have invented a certain new and useful Balancing-Machine, of which the following is a specification.

This invention relates to balancing machines or those devices by which the heavy or light side of an object, as a pulley, for example, is determined with respect to some assumed axis, which axis is usually taken as the axis of rotation of the pulley or similar body.

The object of this invention is to construct an apparatus which will support a body, the balance of which is to be determined, said apparatus being free to tip under the influence of the heavier side of said body, said apparatus being very sensitive so as to indicate slight differences in weight while at the same time the range of movement of said apparatus is kept within very narrow limits.

On the drawings which accompany this specification and form a part thereof and which illustrate embodiments of this invention, and on which the same reference characters are used to designate the same elements in each of the several figures,—Figure 1 represents an elevation, partly in section, of a balancing machine embodying this invention; Fig. 2 is a plan view of the machine shown by Fig. 1; Fig. 3 is an elevation of the machine shown by Fig. 1, the view being taken at right angles to the view as shown by Fig. 1; Fig. 4 is an elevation, partly in section, of a different arrangement of the apparatus and is the form which is preferred at the present time; Fig. 5 is an elevation of a modification.

Referring to the drawings, the numeral 1 designates a turntable which rests upon the support or collar 2, secured to a shaft 3; said collar or support being provided with knife edges 4 which bear upon and are adapted to rock upon hardened V's 5, secured to suitable supports, as for example, the timbers 6. The turntable 1 is adapted to receive the pulley 7, or equivalent object, the balance of which is to be determined, and said turntable with the pulley upon it is adapted to be rotated about the shaft 3 as an axis while the whole apparatus is free to tip upon the knife edges 4. A weight 8 may be secured to the lower end of the shaft 3 to normally preserve the equilibrium of the apparatus, if desired. Secured to the weight 8 or to the shaft 3, and preferably by a link 9 or its equivalent which acts against a knife edge 10, is a spring 11 directly secured to said link 9, as shown by Figs. 1 and 3, and indirectly secured to said link 9, as shown by Fig. 4, the spring 29 which is the equivalent of spring 11 being also indirectly secured to said knife edge 10, as shown by Fig. 5.

Referring to Figs. 1, 2 and 3, the spring which is vertically disposed in alinement with the shaft 3 is secured at its lower end to a link 12, which coacts with knife edge 13, secured to a vertically movable screw-threaded rod 14 which is vertically movable in a standard 15 and secured from rotation therein by the key 16, said standard being provided with an aperture 17 within which aperture is received a gear 18 provided with an apertured screw-threaded hub 19, which engages the screw-threads on the rod 14, and by the rotation of the gear 18, the screw-threaded rod is caused to travel up or down, thereby increasing or decreasing the tension upon spring 11, which is a spring of the tension, or, as it is termed in the trade, closed variety. For convenience in turning gear 18, the gear 20 is provided which meshes therewith and is secured to the shaft 21 provided with a hand operating wheel 22.

In Fig. 4 the same general arrangement of parts is shown with the exception that the spring 11 is not directly connected to the weight 8 or shaft 3, but its lower end is secured thereto by means of the strap 23, preferably of metal, which passes around the lever 24, which in turn bears against the fulcrum 25, said spring being secured at its other end to a screw-threaded bolt 26, which is keyed or splined in a boss 27, and is in screw-threaded engagement with a hand operating wheel or nut 28.

In Fig. 5 is shown the same general arrangement of apparatus as in Fig. 4, the fulcrum 250 being provided for a lever 240 to which is secured the leaf spring 29, this leaf spring 29 bearing against the knife edge 30, secured to the link 31, the upper end of which is formed with the eye 32 or its equivalent, which engages with the knife edge 10, the screw-threaded rod 33 being pivotally connected with the lever 240 and being provided with the screw-threaded nut or hand wheel 34.

The operation and use of the apparatus is as follows: Referring to Fig. 4, for example, a pulley or equivalent object 7 being placed upon the turntable 1, the spring 11 may be put under sufficient tension by operating the hand wheel 28 to keep the shaft 3 from swinging very far from a vertical line under the influence of the heavy side of the pulley, the principle of operation of the apparatus being that while the turntable 1 is free to tip in the position in which it is shown by Fig. 4, the extent of its tipping may be readily regulated by putting the spring 11 under more or less tension; it being perfectly apparent that the knife edge 10 can practically swing through a small part of an arc of a circle before additional strain will be put upon spring 11, the turntable being rotatable, any unsymmetrical distribution of material composing the pulley 7 with respect to its axis of rotation is readily determined by rotating said turntable, while the turntable is at all times under perfect control as to the extent of its tipping by means of the spring 11.

The operation and use of the forms of apparatus disclosed by Figs. 1 and 5 of the drawings are in all respects similar to that just described in connection with the form of apparatus shown by Fig. 4.

What I claim is,—

1. The combination with a support of a turntable supported thereby but rotatable with respect thereto, said support and turntable being free to tip, means yieldably connecting the tipping parts to a stationary point and located to normally exert force in a direction intersecting the axis of tipping, and means for adjusting the connecting means to prevent excessive movement as the support and turntable tip.

2. The combination with a support of a turntable supported thereby but rotatable with respect thereto, said support and turntable being free to tip and an adjustable spring located to normally exert tension in a direction intersecting the axis of tipping, and means to adjust the tension of said spring to prevent excessive movement as the support and turntable tip.

3. The combination with a support of a turntable supported thereby but rotatable with respect thereto, said support and turntable being free to tip, a lever provided with a fulcrum, a strap secured to said support and engaged with said lever and an adjustable spring secured to said strap and means to adjust the tension of said spring.

4. The combination with a support of a turntable supported thereby but rotatable with respect thereto, said support being provided with knife edges upon which it is free to tip and having a shaft secured thereto, a lever provided with a fulcrum, a strap secured to said shaft and engaged with said lever, a spring secured to said strap and means for adjusting the tension of said spring.

In testimony whereof, I affix my signature in the presence of two witnesses.

NORMAN C. BASSETT.

Witnesses:
G. F. DE WEIN,
FRANK E. DENNETT.